US012756478B2

(12) United States Patent
Babaee et al.

(10) Patent No.: US 12,756,478 B2
(45) Date of Patent: Oct. 6, 2026

(54) METHOD AND SYSTEM FOR BLIND LEARNING OF VOLTERRA EQUALIZER PARAMETERS

(71) Applicant: CIENA CORPORATION, Hanover, MD (US)

(72) Inventors: Ramin Babaee, Ottawa (CA); Shahab Oveis Gharan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 231 days.

(21) Appl. No.: 18/768,868

(22) Filed: Jul. 10, 2024

(65) Prior Publication Data

US 2026/0019160 A1 Jan. 15, 2026

(51) Int. Cl.
*H04B 10/61* (2013.01)

(52) U.S. Cl.
CPC ..... *H04B 10/6163* (2013.01); *H04B 2210/25* (2013.01)

(58) Field of Classification Search
CPC ............ H04B 10/6163; H04B 10/2507; H04B 10/616; H04B 2210/25; G06N 20/00
USPC .......................................................... 398/202
See application file for complete search history.

(56) References Cited

U.S. PATENT DOCUMENTS

2020/0396575 A1* 12/2020 Kim .......................... G06N 3/04
2023/0010592 A1* 1/2023 Zhang .................... H04B 10/58
2023/0388015 A1* 11/2023 Vinayachandran .......................... H04B 10/2507
2026/0019160 A1* 1/2026 Babaee ............. H04B 10/6163

FOREIGN PATENT DOCUMENTS

KR 20220118182 A * 8/2022 ......... H04B 10/6971

OTHER PUBLICATIONS

Yuya et al; Efficient Realization for Third-Order Volterra Filter Based on Singular Value Decomposition, Oct. 2022, Applied Sciences, pp. 1-12. (Year: 2022).*
Bashar et al; Volterra-Based Machine Learning Compensation of Non-Linear Distortions in an Optoelectronic Terahertz Communication System, Oct. 2024, IEEE, pp. 1-6. (Year: 2024).*
"International Search Report and Written Opinion—PCT/US2025/037130", PCT/US2025/037130, ISR mailed Nov. 18, 2025, Nov. 18, 2025, 10 pgs.

(Continued)

*Primary Examiner* — Amritbir K Sandhu
(74) *Attorney, Agent, or Firm* — Guntin & Gust, PLC; Kenneth S. Kwan

(57) ABSTRACT

Aspects of the subject disclosure may include, for example, conducting blind learning of correction parameters for non-linear (NL) distortion associated with one or more components of a system, resulting in learned correction parameters, wherein the conducting is performed without a need to identify or estimate a reference input associated with the one or more components, and causing the learned correction parameters to be applied to an output signal associated with the one or more components to compensate for the NL distortion. Other embodiments are disclosed.

20 Claims, 14 Drawing Sheets

(56) References Cited

OTHER PUBLICATIONS

Reza, et al., "High-speed PAM-4 Signal Transmissions with Directly Modulated Lasers for the Next-Generation Passive Optical Networks", 2021 International Conference on Information and Communication Technology Convergence (ICTC), IEEE,Oct. 20, 2021 (Oct. 20, 2021), p. 747-749, XP034038785, Oct. 20, 2021, 3 pgs.
"Isserlis' theorem", Wikipedia retrieved May 30, 2024 | https://en.wikipedia.org/wiki/Isserlis#:~:text=Isserlis%27%20theorem%2C%20a%20formula%20in,probability%20theory%20named%20after%20Leon%20Isserlis, May 30, 2024, 6 pgs.
Guiomar , et al., "Mitigation of Intra-Channel Nonlinearities Using a Frequency-Domain Volterra Series Equalizer", Opt. Express, vol. 20, No. 2, pp. 1360-1369, 2012, 3 pgs.
Pan , et al., "Volterra filtering for nonlinearity impairment mitigation in DP-16QAM and DP-QPSK fiber optic communication systems", Proc. Opt. Fiber Commun. Conf. (OFC), paper JThA40, 2011, 4.
Yan , et al., "80 km IM-DD transmission for 100 GB/s per lane enabled by DMT and nonlinearity management", Proc. Opt. Fiber Commun., San Francisco, CA, USA, 2015, Paper M2I.4., 2015, 3 pgs.
Zhang , et al., "An efficient hybrid equalizer for 50 GB/s PAM-4 signal transmission over 50 km SSMF in a 10-GHz DML-based IM/DD system", Proc. Conf. Lasers Electro-Opt., San Jose, CA, USA, 2017, Paper SF1L.1., 2017, 2 pgs.
Zhang , et al., "C-band single wavelength 100-GB/s IM-DD transmission over 80-km SMF without CD compensation using SSB-DMT", Proc. Opt. Fiber Commun., Los Angeles, CA, USA, 2015, Paper Th4A.2., 2015, 3 pgs.

* cited by examiner

1

| Mode | Triplet Identification | Triplet Coefficient Calulation |
|---|---|---|
| Triad | Triad | Triad |
| Calibration | Blind (Matching Pursuit) | Blind |
| Tracking | Ideal | Blind |
| Closed-loop Tracking | Ideal | Blind |

FIG. 2D

D = 2

METHOD AND SYSTEM FOR BLIND LEARNING OF VOLTERRA EQUALIZER PARAMETERS

FIELD OF THE DISCLOSURE

The subject disclosure relates to blind learning of Volterra equalizer parameters.

BACKGROUND

Volterra series are widely used in telecommunications equipment to compensate for non-linear (NL) distortion exhibited by optical/electrical components, fiber, etc. The discrete-time expression of a Volterra series is given as:

$$y[n] = \sum_{k=1}^{K} \sum_{n_1=a}^{b} \dots \sum_{n_k=a}^{b} h(n_1, n_2, \dots, n_k) \prod_{j=0}^{p} x[n-n_j]$$

where $h(n_1, n_2, \ldots, n_k)$ is called the k-th order kernel. The kernels of the Volterra series represent the NL impulse responses of the system. $3^{rd}$-order non-linearity is often the predominant distortion element of analog amplifiers, optical amplifiers, analog-to-digital converters (ADCs), and similar devices. Consequently, a $3^{rd}$-order Volterra equalizer (referred to herein as a triplet model) is often implemented for NL compensation. The $3^{rd}$ order Volterra series can be simplified as $$y[n] = \sum_{i=1}^{N_{terms}} \alpha_i x\left[n-\tau_i^{(1)}\right] x\left[n-\tau_i^{(2)}\right] x\left[n-\tau_i^{(3)}\right],\ a \le \tau_i^{(1)}, \tau_i^{(2)}, \tau_i^{(3)} \le b$$

where $N_{terms}$ is the number of triplets, $\alpha_i$ is the kernel/coefficient, and $\alpha$ and b are the lower and upper bounds of the memory of the Volterra series, respectively. A goal is to identify the coefficients/kernel values for this model. In a coherent optical receiver, where a transimpedance amplifier (TIA) and an ADC exhibit NL distortion, a reference signal is typically used to correlate with the ADC output signal in order to find the best sets of triplet terms and their corresponding coefficients. For instance, during factory calibration, a waveform is typically sent from the transmitter (Tx) to the receiver (Rx), and by performing cross-correlation of the received signal (after the ADC) with the transmitted signal (i.e., the reference signal), the model parameters can be calculated and stored. At chip initialization (or chip bring-up), the stored values are then used to program the triplet model for NL correction. A reference signal can be obtained from the input to the Rx opto-electric (OE) chain or from the programmed waveform in a Tx front end test (TFET) memory (i.e., in a loopback mode). As an example, one method relies on TFET memory and Rx front end test (RFET) memory patterns to figure out the triplet terms and coefficients. In any case, calibration is generally only performed for a single test/environmental setting at the factory.

It is believed that existing Volterra series-based equalizer implementations only attempt to address NL distortion by using a reference/ideal signal or by using an estimate of the reference signal that is derived by decoding the received signal using digital signal processing (DSP) and calculating estimated symbols from the decoded signal. Some Volterra series-based NL equalizers are described in the following papers, each of which is incorporated by reference herein in its entirety:

Z. Pan, B. Chatelain, M. Chagnon, and D. V. Plant, "Volterra filtering for nonlinearity impairment mitigation in DP-16QAM and DP-QPSK fiber optic communication systems," in *Proc. Opt. Fiber Commun. Conf.* (*OFC*), paper JThA40, 2011;

F. P. Guiomar, J. D. Reis, A. L. Teixeira, and A. N. Pinto, "Mitigation of intra-channel nonlinearities using a frequency-domain Volterra series equalizer," *Opt. Express*, vol. 20, no. 2, pp. 1360-1369, 2012;

L. Zhang et al., "C-band single wavelength 100-Gb/s IM-DD transmission over 80-km SMF without CD compensation using SSB-DMT," in *Proc. Opt. Fiber Commun.*, Los Angeles, CA, USA, 2015, Paper Th4A.2;

W. Yan et al., "80 km IM-DD transmission for 100 Gb/s per lane enabled by DMT and nonlinearity management," in *Proc. Opt. Fiber Commun.*, San Francisco, CA, USA, 2015, Paper M2I.4; and J. Zhang et al., "An efficient hybrid equalizer for 50 Gb/s PAM-4 signal transmission over 50 km SSMF in a 10-GHz DML-based IM/DD system," in *Proc. Conf. Lasers Electro-Opt.*, San Jose, CA, USA, 2017, Paper SFIL.1.

There are certain situations where a reference signal is not available, such as in mission mode (i.e., during nominal operating conditions). For instance, a component's NL distortion may change with temperature, component configuration, baud rate, etc. Further, in the specific case of compensating for TIA/ADC NL distortion in a coherent optical receiver, where the signal that is at the input of the TIA needs to be known in order to determine parameters for compensating the NL distortion, obtaining that signal can be quite challenging. While it might be possible to use the estimated symbols at the output of a downstream symbol decoder (i.e., the DSP) to compute an estimate of the signal that is at the input of the TIA, that would generally require all of the DSP processing that is done at the receiver (including, e.g., DSP relating the intermediate frequency (IF), the least mean square (LMS) response, chromatic dispersion (CD), and so on) to be reverted, which can be quite substantial and thus impractical. Indeed, the output of the ADC is generally heavily distorted due to CD, laser IF, clock jitter, differential group delay, etc. and, in fact, appears to be purely Gaussian due to the CD. It is thus very difficult to use the ADC output in symbol estimation to recover a close equivalent of the signal that is at the input of the TIA. For many channels, the CD impulse response is so long that it would require many thousands of symbols to be convolved in order to make such a recovery attempt.

BRIEF DESCRIPTION OF THE DRAWINGS

Reference will now be made to the accompanying drawings, which are not necessarily drawn to scale, and wherein:

FIG. 2D shows a summary of modes used in various simulations involving the system of FIG. 2B.

DETAILED DESCRIPTION

Figure 1A:
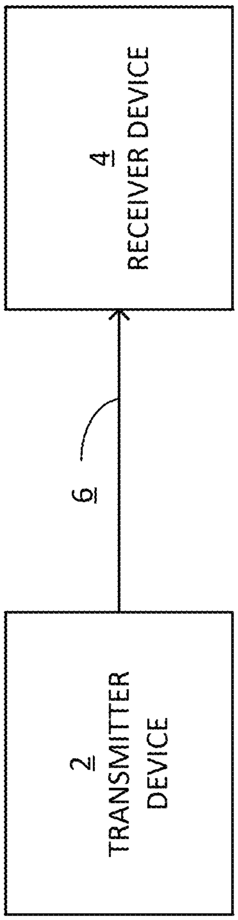
FIG. 1A is a diagram of a non-limiting example of a communication network in accordance with various aspects described herein.

The subject disclosure describes, among other things, illustrative embodiments of a (e.g., fully) blind NL distortion learning algorithm that is capable of generating NL distortion correction parameters based on tracking of NL distortion as it changes during system operation. In exemplary embodiments, the blind learning algorithm may be configured to train a triplet model to identify model parameters by relying (e.g., only) on the ADC output signal that is captured in an RFET memory (i.e., after observing the non-linearity). In one or more embodiments, the blind learning algorithm may be configured to empirically calculate the $4^{th}$ moment of a received signal (that includes the NL distortion) and utilizing the calculation as part of the learning procedure.

Implementing blind learning of NL distortion, as described herein, advantageously allows for NL distortion correction and thus considerable modem SNR improvement even when the system is operated in mission mode where an ideal reference signal is generally not available. Further, it is believed that decision-directed estimation of such a reference signal (by decoding the received signal using DSP and calculating estimated symbols from the decoded signal) is only suitable for direct-detect links. In coherent detection, where there is significant intermediate DSP processing (e.g., for IF, CD, clock jitter, differential group delay, etc.) between the TIA and the decoded symbols from the DSP, reversion of such DSP generally does not recover the transmitted signal from the ADC output signal since the signal tends to appear as a purely Gaussian signal due to the CD effect. Further, for many channels, the CD impulse response is so long that it would require the convolution of many thousands of symbols in order to attempt to recover an equivalent transmitted signal from the ADC output, which is generally not practical. Embodiments of the blind NL learning algorithm described herein thus advantageously address the coherent case, obviating a need for undue effort in reverting DSP processing and thereby conserving processing time and resources.

One or more aspects of the subject disclosure include a coherent optical receiver, comprising one or more components configured to receive or perform processing relating to optical signals, and a correction system configured to perform operations. The operations may include conducting blind learning of correction parameters for non-linear (NL) distortion associated with the one or more components, resulting in learned correction parameters, wherein the conducting is performed without a need to identify or estimate a reference input associated with the one or more components. The operations may further include causing the learned correction parameters to be applied to an output signal associated with the one or more components to compensate for the NL distortion.

One or more aspects of the subject disclosure include a non-transitory machine-readable medium, comprising executable instructions that, when executed by a processing system including a processor, facilitate performance of operations. The operations may include conducting blind learning of correction parameters for non-linear (NL) distortion associated with one or more components of a system, resulting in learned correction parameters, wherein the conducting is performed without a need to identify or estimate a reference input associated with the one or more components. The operations may further include causing the learned correction parameters to be applied to an output signal associated with the one or more components to compensate for the NL distortion.

One or more aspects of the subject disclosure include a method. The method may include conducting, by at least one processor, blind learning of correction parameters for non-linear (NL) distortion associated with one or more components of a system, resulting in learned correction parameters, wherein the conducting is performed without a need to identify or estimate a reference input associated with the one or more components. The method may further include causing, by the at least one processor, the learned correction parameters to be applied to an output signal associated with the one or more components to compensate for the NL distortion.

Other embodiments are described in the subject disclosure.

FIG. 1A is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver.

The communication network 1 may include additional elements not shown in FIG. 1A. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 1A, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 1B:
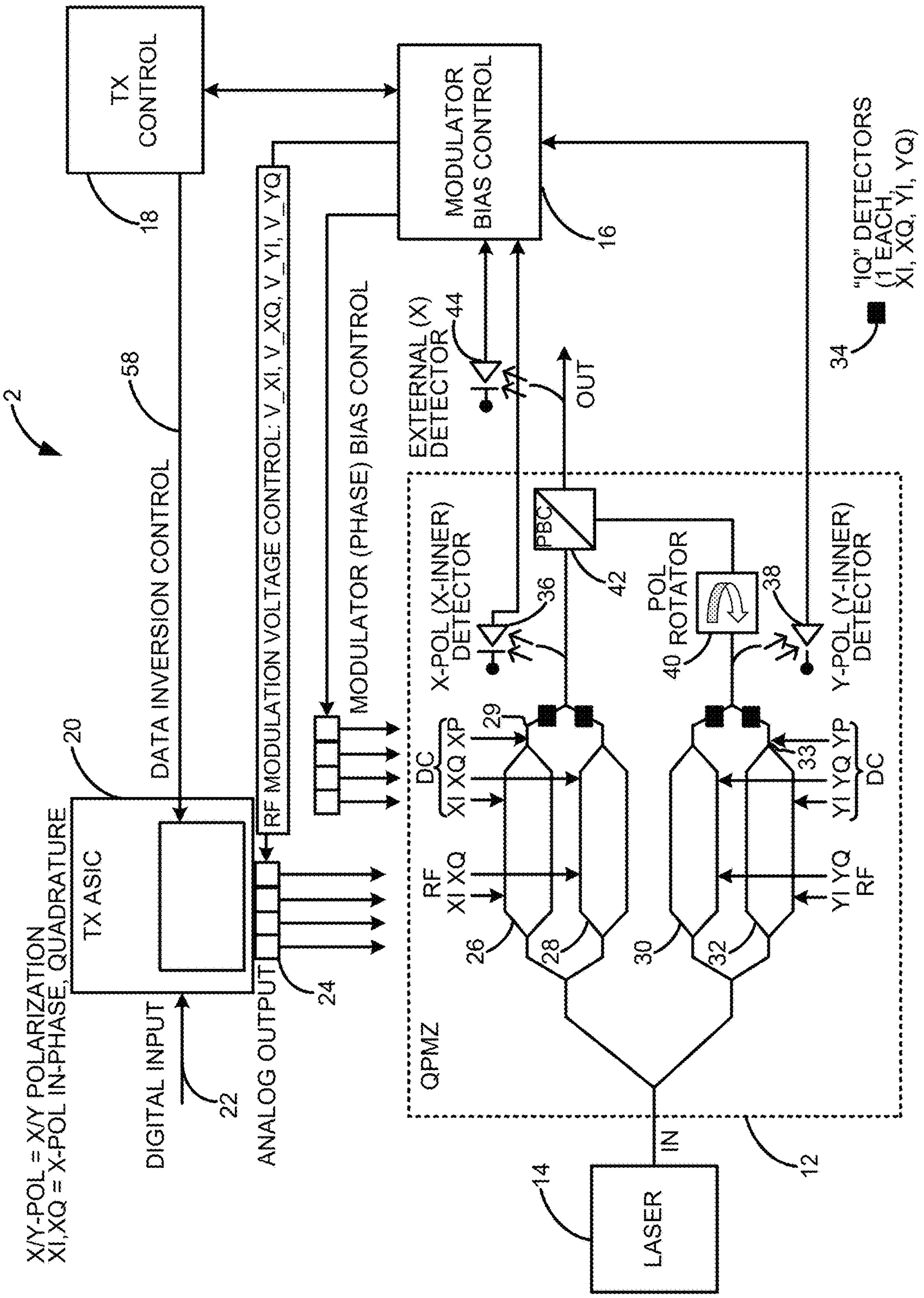
FIG. 1B is a block diagram of an example, non-limiting embodiment of a transmitter/modulator system in accordance with various aspects described herein.

FIG. 1B is a block diagram of an example, non-limiting embodiment of a transmitter/modulator system 2 in accordance with various aspects described herein. As shown in FIG. 1B, the transmitter device 2 may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ—resulting in a quad parallel MZ (QPMZ) modulator.

In one or more embodiments, the optical modulator system 2 may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 1B, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Figure 1C:
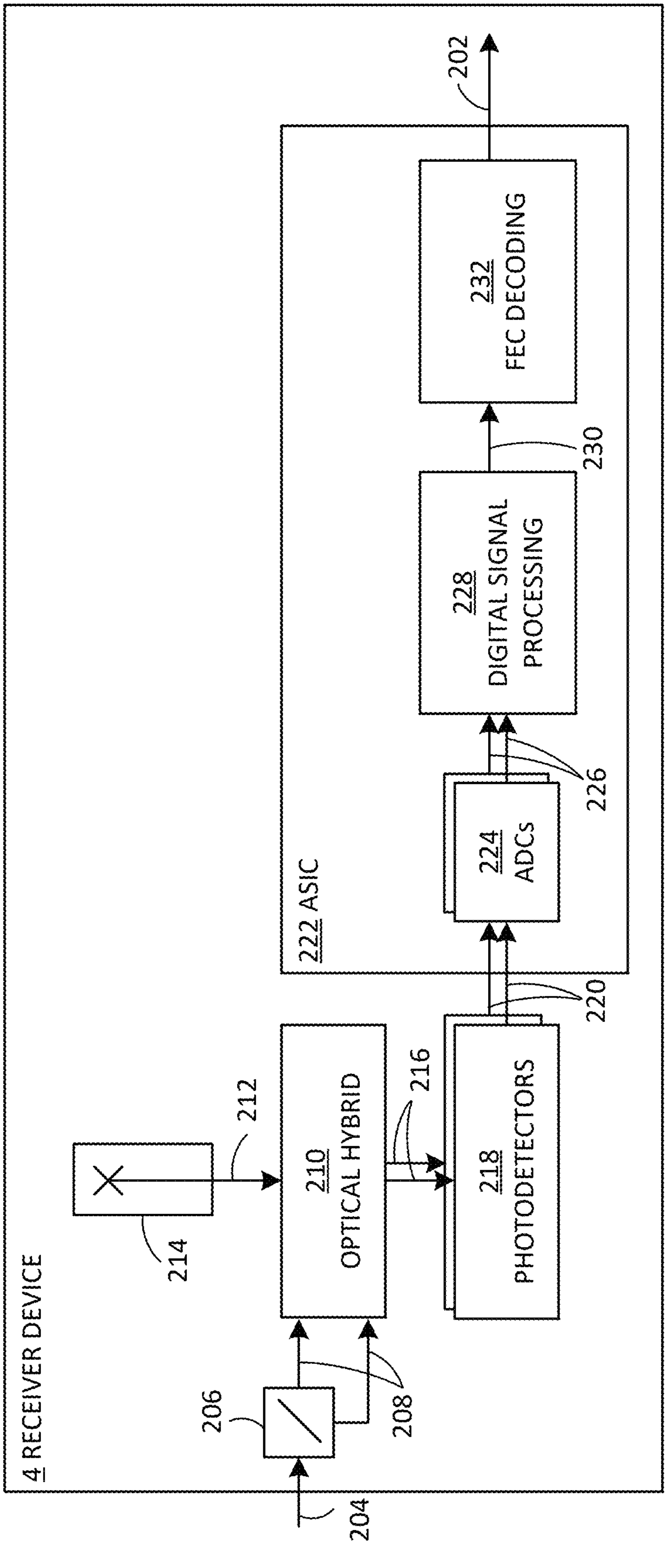
FIG. 1C is a block diagram of an example, non-limiting embodiment of a receiver device in accordance with various aspects described herein.

FIG. 1C is a block diagram of an example, non-limiting embodiment of a receiver device 4 in accordance with various aspects described herein. In various embodiments, the receiver device 4 may be configured to receive an optical signal 204, which may comprise a degraded version of an optical signal generated by a transmitter device (e.g., the transmitter device 2 of FIG. 1A). The optical signal generated by the transmitter device may be representative of information bits (also referred to as client bits) which are to be communicated to the receiver device 4. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like.

The receiver device 4 may be configured to recover corrected client bits 202 from the received optical signal 204. The receiver device 4 may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog electrical signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 1C, the receiver device 4 may include an ASIC 222. The ASIC 222 may include analog-to-digital converters (ADCs) 224 that are configured to sample the analog electrical signals 220 and generate respective digital signals 226. In certain alternate embodiments, the ADCs 224 or portions thereof may be separate from the ASIC 222. The ADCs 224 may sample the analog electrical signals 220 periodically at a sample rate that is based on a signal received from a voltage-controlled oscillator (VCO) at the receiver device 4 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset fIF (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

Figure 2A:
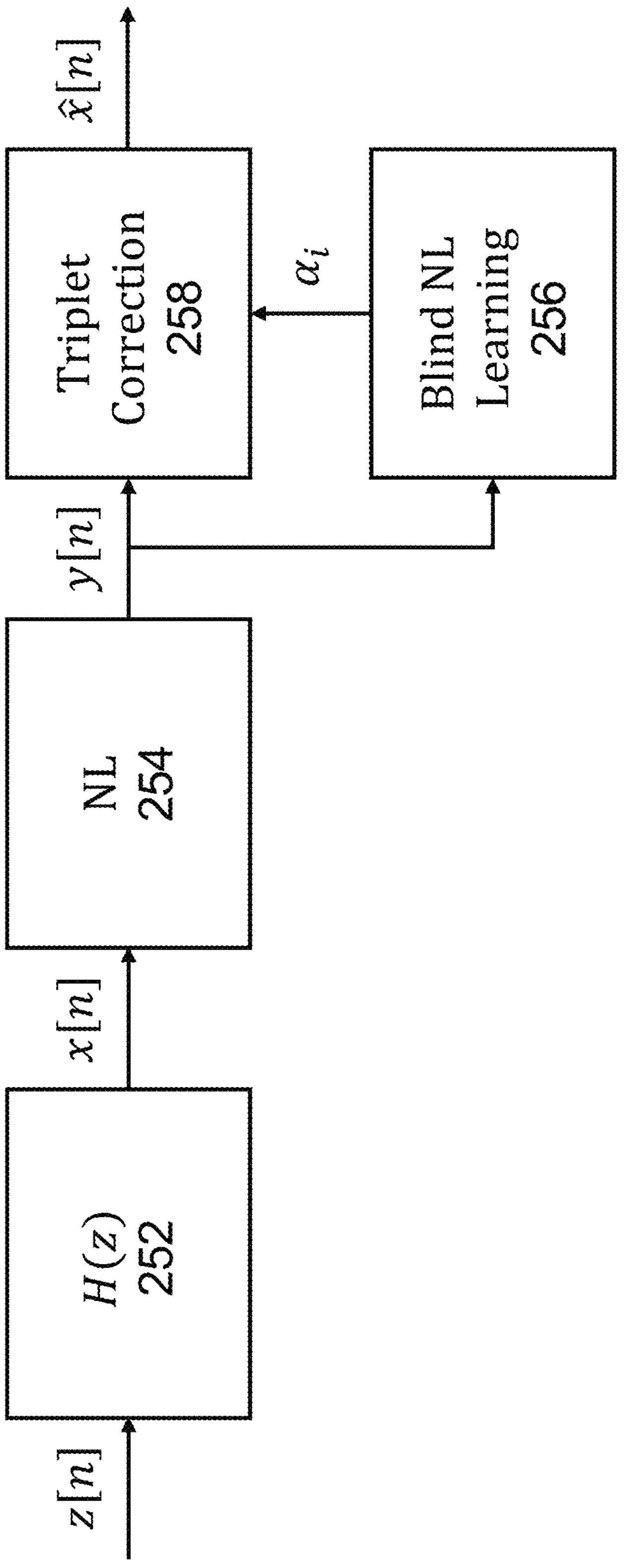
FIG. 2A is a block diagram of an example, non-limiting embodiment of a NL distortion correction system in accordance with various aspects described herein.

FIG. 2A is a block diagram of an example, non-limiting embodiment of a NL distortion correction system in accordance with various aspects described herein. Assume that z[n] is a white Gaussian signal with bandwidth B that is filtered by linear response h[n]. We thus have:

$$x[n] = z[n] * h[n]$$

where x[n] is a linear input to a NL block 254, which may represent component(s) (e.g., amplifier(s), ADC(s), and/or the like) that exhibit $3^{rd}$-order NL distortion. The output of the NL block 254 is y[n], which may be fed to both a blind NL learning block 256 and a triplet correction block 258. The blind NL learning block 256 may employ an algorithm that learns the input-output behavior of the NL block 254. More specifically, the algorithm may output coefficients $\alpha_i$; that estimate NL terms of the $3^{rd}$-order NL distortion based on the output y[n] of the NL block 254, without relying on a reference signal or an estimate of such a reference signal that is derived from a decoded signal. The triplet correction block 258 may be configured to correct for the NL distortion using the set of coefficients $\alpha_i$. The blind NL learning block 256 and/or the triplet correction block 258 may be implemented in any suitable manner, such as in hardware, firmware, or a combination of hardware and software.

In various embodiments, the output y[n] may be formulated as the sum of two components—i.e., the term x[n] and a term Triplet(x[n]) that is composed of triplet terms (i.e., products of three delayed versions of x[n]) and their corresponding coefficients $a_i$:

$$y[n] = x[n] + \text{Triplet}(x[n]) = x[n] + \sum_{i=1}^{N_{terms}} \alpha_i x\left[n - \tau_i^{(1)}\right] x\left[n - \tau_i^{(2)}\right] x\left[n - \tau_i^{(3)}\right]$$

where $$\tau_i^{(1)}, \tau_i^{(2)}, \text{ and } \tau_i^{(3)}$$

correspond to delay values and $N_{terms}$ is the number of triplets used for modeling of the non-linearity. In this example, $N_{terms}$ sets of triplet terms may be calculated from which a select number of sets of triplet terms, $N_{triplet}$, may be used for NL distortion compensation.

The following is a detailed description of an embodiment of the blind NL learning algorithm, which may be used for learning coefficients $a_i$ during calibration (i.e., in calibration mode) and during tracking (i.e., in mission mode). Given a measured waveform y[n], there are two problems to solve. First, while calibration to address the NL distortion may be performed pre-mission (e.g., during manufacturing or in a lab setting), where a reference input signal may be known, blind NL learning may alternatively be employed in the calibration mode, particularly in cases where the reference input signal is not available. Here, dominant triplet terms (i.e., those that contribute the most to the NL distortion—say, five of the twenty-four triplet terms) may be identified according to the following optimization problem:

$$\min_{\alpha} E\left\{\left|y[n] - x[n] - \sum_{i=1}^{N_{terms}} \alpha_i x\left[n - \tau_i^{(1)}\right] x\left[n - \tau_i^{(2)}\right] x\left[n - \tau_i^{(3)}\right]\right|^2\right\}$$

$$\text{subject to } \|\alpha\|_0 \le N_{triplet}$$

where $\alpha$ is a vector containing the gain factors $\alpha_i$, and $\|\alpha\|_0$ is the l0-norm of vector $\alpha$. The l0-norm constraint ensures that at most $N_{triplet}$ terms are selected for NL distortion compensation. The coefficients $\alpha_i$, when determined, may be (e.g., manually or automatically) provided to or programmed into the triplet correction lock 258 for use.

In the tracking mode, dominant triplets may be known (e.g., $$\tau_{1 \ldots N_{triplet}}^{(1 \ldots 3)}\Big)$$

may be known based what has been learned during calibration, whether conducted using a known reference signal or using the blind NL distortion learning algorithm in the calibration mode), and so the problem is simply to find the gain factors at such that $$\min_{\alpha} E\left\{\left|y[n] - x[n] - \sum_{i \in T} \alpha_i x\left[n - \tau_i^{(1)}\right] x\left[n - \tau_i^{(2)}\right] x\left[n - \tau_i^{(3)}\right]\right|^2\right\}$$

where T denotes the set of known or desired triplet terms.

If x[n] were available, a goal would of course be to find the values of di such that the error between x[n] and y[n] is minimized. A corrected waveform that is a sum of the triplet terms, weighted by $\alpha_i$ could then be used in triplet correction to address the NL distortion. However, since the signal x[n] is not available (which is generally the case in the tracking or mission mode or even in certain scenarios during calibration), the blind NL learning algorithm may obtain high-order statistics of the measured signal y[n] to solve a similar problem and compute the gain factors $\alpha_i$. Using a high-order autocorrelation function effectively equates to analyzing the interactions between four consecutive samples of the measured signal y[n], which can provide valuable insights into the underlying statistical structure of the signal y[n]. More specifically, the $4^{th}$-order autocorrelation function of signal y[n] may be obtained as follows:

$$R_4^y(t_1, t_2, t_3) := E\{y[n]\, y[n+t_1]\, y[n+t_2]\, y[n+t_3]\}$$

where $0 \le t_1 \le t_2 \le t_3 \le D$, and where D is the maximum delay. Substituting y[n], we have:

$$\begin{aligned} R_4^y(t_1, t_2, t_3) = E\Bigg\{ & \left(x[n] + \sum_{i=1}^{N_{terms}} \alpha_i x\left[n - \tau_i^{(1)}\right] x\left[n - \tau_i^{(2)}\right] x\left[n - \tau_i^{(3)}\right]\right) \cdot \\ & \left(x[n+t_1] + \sum_{j=1}^{N_{terms}} \alpha_j x\left[n - \tau_j^{(1)} + t_1\right] x\left[n - \tau_j^{(2)} + t_1\right] x\left[n - \tau_j^{(3)} + t_1\right]\right) \cdot \\ & \left(x[n+t_2] + \sum_{k=1}^{N_{terms}} \alpha_k x\left[n - \tau_k^{(1)} + t_2\right] x\left[n - \tau_k^{(2)} + t_2\right] x\left[n - \tau_k^{(3)} + t_2\right]\right) \cdot \\ & \left(x[n+t_3] + \sum_{l=1}^{N_{terms}} \alpha_l x\left[n - \tau_l^{(1)} + t_3\right] x\left[n - \tau_l^{(2)} + t_3\right] x\left[n - \tau_l^{(3)} + t_3\right]\right)\Bigg\} \end{aligned}$$

where subscripts j, k, and l are used here simply to distinguish the different factors in the multiplication. One skilled in the art would readily recognize that calculating all of the terms in this equation can be cumbersome and thus not practical. However, since the coefficients $\alpha_i$, $\alpha_j$, $\alpha_k$, and $\alpha_l$ are expected to be very small compared to the main signal, i.e., <<1, all of the expressions where the product of at least two coefficients is close to zero (e.g., $\alpha_i\alpha_j \approx 0$, $\alpha_i\alpha_l \approx 0$, $\alpha_k\alpha_l \approx 0$, etc.) may be ignored. Therefore, we can approximate the $4^{th}$ autocorrelation as $$R_4^y(t_1, t_2, t_3) \approx R_4^x(t_1, t_2, t_3) + \sum_i \alpha_i F_i(R_2^x, R_4^x, R_6^x, t_1, t_2, t_3)$$

where $F_i$ $$(R_2^x, R_4^x, R_6^x, t_1, t_2, t_3)$$

is a linear function of the $2^{nd}$, $4^{th}$, and $6^{th}$-order autocorrelations of x[n]. Given the waveform y[n], we can empirically calculate $$R_4^y$$

$t_1$, $t_2$, $t_3$). In order to find the triplet coefficients $\alpha_i$, we also need an estimate of the higher statistics of signal x[n]. Given that the non-linearity of signal y[n] is at most −25 decibel (dB) (that is, the coefficients $\alpha_i$ are generally very small compared to x[n], and so x[n] is very close to y[n]), the $2^{nd}$-order statistics of signal x[n] can be very well approximated with the sampled autocorrelation of y[n]. Thus, we have:

$$\hat{R}_2^x(t) \approx \hat{R}_2^y(t)$$

where $$\hat{R}_2^x(t)$$

denotes the $2^{nd}$-order autocorrelation function of x[n]. In other words, we have:

$$\hat{R}_2^x(t) := E\{x[n]x[n+t]\}$$

The higher-order autocorrelation functions of x[n] can be derived using the following equations:

The $4^{th}$-order autocorrelation function:

$$R_4^x(t_1, t_2, t_3) = R_2^x(t_1) \cdot R_2^x(t_3 - t_2) + R_2^x(t_2) \cdot R_2^x(t_3 - t_1) + R_2^x(t_3) \cdot R_2^x(t_2 - t_1)$$

The $6^{th}$-order autocorrelation function:

$$\begin{aligned} R_6^x(t_1, t_2, t_3, t_4, t_5) :=& \\ &E\{x[n]x[n+t_1]x[n+t_2]x[n+t_2]x[n+t_3]x[n+t_4]x[n+t_5]\} = \\ &R_2^x(t_1) \cdot R_4^x(t_3 - t_2, t_4 - t_2, t_5 - t_2) + \\ &R_2^x(t_2) \cdot R_4^x(t_3 - t_1, t_4 - t_1, t_5 - t_1) + R_2^x(t_3) \cdot R_4^x(t_2 - t_1, t_4 - t_1, t_5 - t_1) + \\ &R_2^x(t_4) \cdot R_4^x(t_2 - t_1, t_3 - t_1, t_5 - t_1) + R_2^x(t_5) \cdot R_4^x(t_2 - t_1, t_3 - t_1, t_4 - t_1) \end{aligned}$$

Note that these equations may be valid only when signal x[n] is defined as $$x[n] = z[n] * h[n]$$

where z[n] is a zero-mean white Gaussian signal, and where h[n] is a linear filter. The generalization to arbitrary z[n] will be slightly more involved. In any case, with all of the terms now known except for the coefficients $\alpha_i$, the optimization objective becomes a least-squares problem, i.e.:

$$\min_a \sum_{t_1=0}^{D} \sum_{t_2=t_1}^{D} \sum_{t_3=t_2}^{D} \left| \sum_i \alpha_i \hat{F}_i(\hat{R}_2^x, \hat{R}_4^x, \hat{R}_6^x, t_1, t_2, t_3) + \hat{R}_4^x(t_1, t_2, t_3) - \hat{R}_4^y(t_1, t_2, t_3) \right|^2$$

where $\hat{F}_i$ are the functions that depend on the values of $$\hat{R}_2^x, \hat{R}_4^x, \hat{R}_6^x,$$

and the triple summation term goes over all possible combinations of the indices $t_1$, $t_2$, $t_3$. Here, we want to find the best possible values for coefficients at that reduce or minimize the difference between the predicted values $$\sum_i \alpha_i \hat{F}_i(\hat{R}_2^x, \hat{R}_4^x, \hat{R}_6^x, t_1, t_2, t_3) + \hat{R}_4^x(t_1, t_2, t_3)$$

and the actual values $$\hat{R}_4^y(t_1, t_2, t_3).$$

That is, a goal is to find the values of $\alpha_i$ that reduce or minimize this objective function, which represents the total squared error between the predicted values and the actual values. The determined values of $\alpha_i$ would then be the possible fit for the data.

In the tracking mode, where desired triplet terms are already known (e.g., from factory calibration), the optimization objective becomes a simple least-squares (LS) problem, where all of the coefficients $\alpha_i$ may be set to 0 except for those of the desired triplet terms. In this case, the number of variables is $N_{triplets}$. As an example, if five sets of triplet terms out of twenty-four sets of triplet terms are considered most dominant (e.g., terms 1, 2, 10, 16, and 20 of the 24), then the coefficients for those terms (e.g., $\alpha_1$, $\alpha_2$, $\alpha_{10}$, $\alpha_{16}$, and $\alpha_{20}$) may be determined and used for the NL distortion correction in the triplet correction block 258. While the LS requires a matrix inversion of size $N_{triplets} \times N_{triplets}$, alternative approaches such as Gaussian elimination or iterative approaches such as the LMS algorithm may be used to avoid matrix inversion. In actual operation in the tracking mode, the blind NL learning block 256 or an associated component may be configured to identify differences between existing coefficients $\alpha_i$ (e.g., calculated during calibration) and corresponding currently-determined coefficients $\alpha_i$, and trigger an update of the coefficients $\alpha_i$ in the triplet correction block 258 based on the identified differences, such that NL distortion compensation may adjust accordingly as NL distortion changes during operation.

In the calibration mode, the optimization problem may be relaxed by allowing any arbitrary subset of triplets of size $N_{triplets}$ to be selected. Under this assumption, we have $$\min_a \sum_{t_1=0}^{D} \sum_{t_2=t_1}^{D} \sum_{t_3=t_2}^{D} \left| \sum_i \alpha_i \hat{F}_i(\hat{R}_2^x, \hat{R}_4^x, \hat{R}_6^x, t_1, t_2, t_3) + \hat{R}_4^x(t_1, t_2, t_3) - \hat{R}_4^y(t_1, t_2, t_3) \right|^2$$

-continued $$\text{subject to } \|\alpha\|_0 \le N_{triplets}$$

This is an NP-hard problem to solve. However, one or more greedy algorithms may be employed to solve the problem. For instance, a sub-optimal solution that identifies triplet terms may be computed using the Matching Pursuit (MP) algorithm. Regardless of the algorithm employed, with the triplet terms identified, LS can then be used (e.g., similar to the tracking mode) to compute the (e.g., optimal or desired) gain factors $\alpha_i$.

Figure 2B:
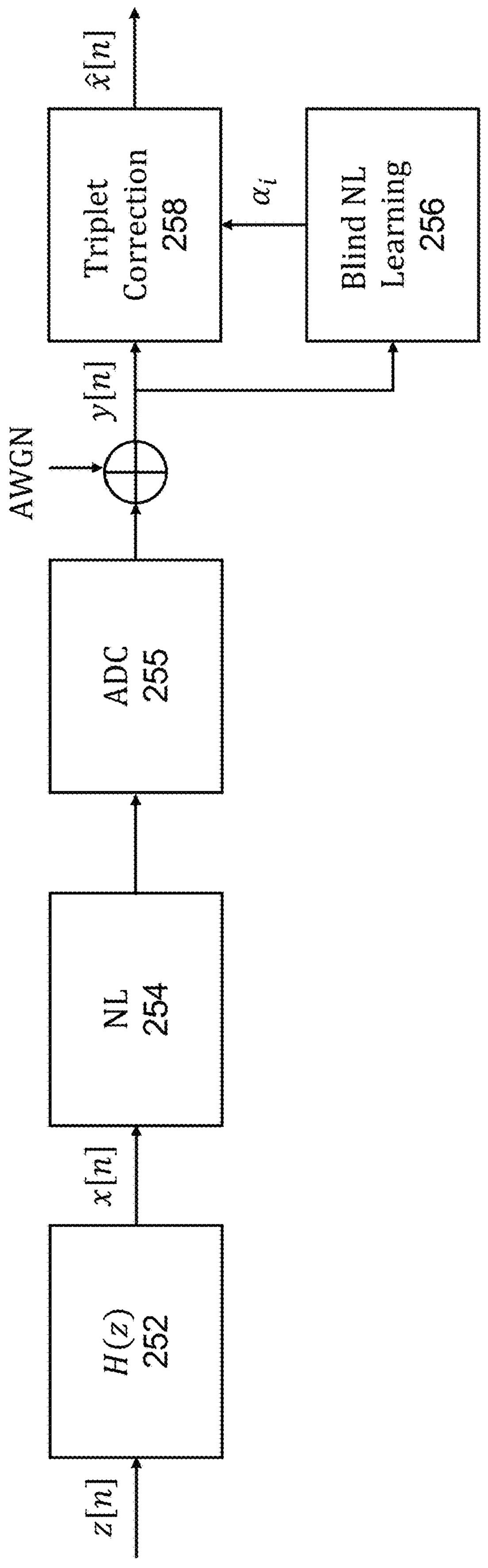
FIG. 2B is a block diagram of another example, non-limiting embodiment of a NL distortion correction system in accordance with various aspects described herein.
Figure 2C:
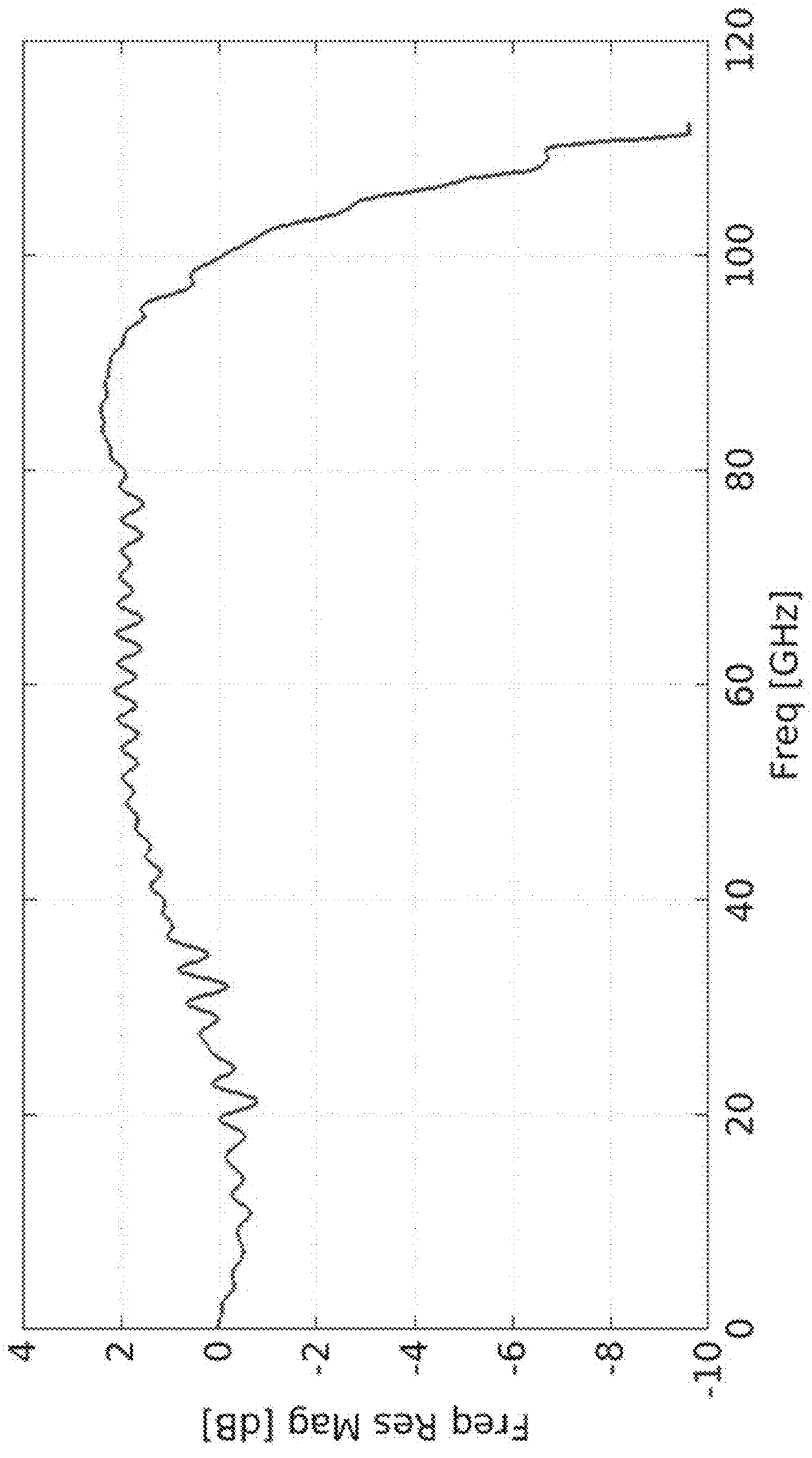
FIG. 2C shows the OE filter response of the system of FIG. 2B.
Figure 2E:
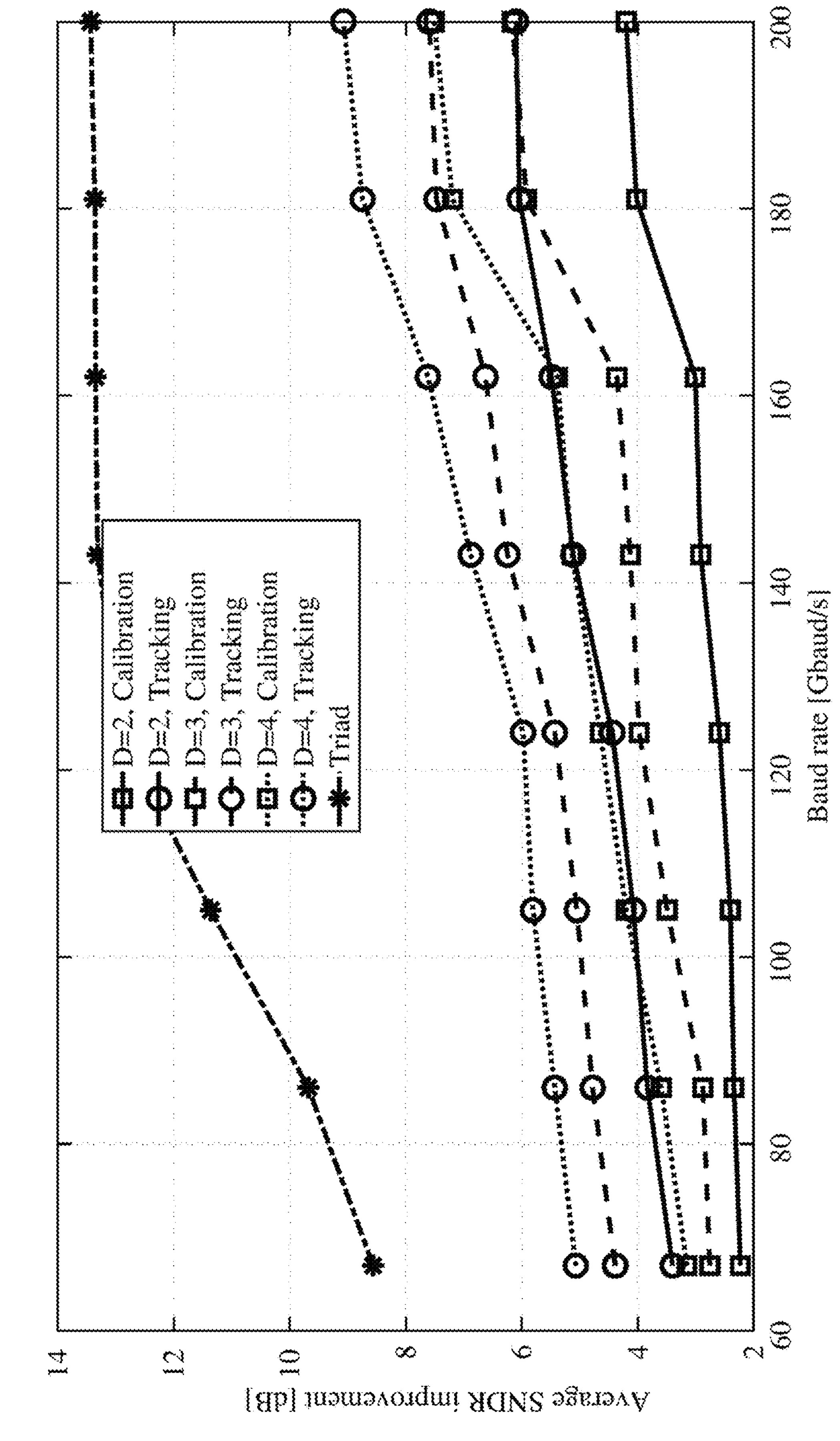
FIG. 2E is a simulation plot of the NL signal-to-noise-distortion ratio (SNDR) improvement after the NL correction for tracking and calibration modes as a function of baud rate, where the triplet population includes twenty-four terms.

FIG. 2B is a block diagram of another example, non-limiting embodiment of a NL distortion correction system in accordance with various aspects described herein. The system of FIG. 2B is generally the same as the system of FIG. 2A, but with the addition of an ADC block 255 (to ensure that quantization noise and clipping do not have a significant impact on the learning performance) and the addition of AWGN at the output of the ADC block 255. Various assumptions/parameters were used for a simulation of the system of FIG. 2B, as follows:

- No neighboring wavelength division multiplexing (WDM) channel considered
- ADC bit resolution: 7 bit
- Frequency Sweep to Root Mean Square (FS2RMS) at ADC input: 8
- ADC clipping rate: [10^-6, 10^-4]
- Each point on the plot is the averaged result of 100 waveforms
- For each waveform, the subset of NL triplets (5 triplets) is randomly selected from 24 triplets
- Number of samples in each waveform: 10^5.
- NL SNR=25 dB for each waveform FIG. 2C shows the OE filter response of the system of FIG. 2B. FIG. 2D shows a summary of modes used in various simulations involving the system of FIG. 2B. There are two aspects for triplet configuration optimization. The first task is to identify the five most dominant triplets out of twenty-four. The second task is to optimize the coefficients $\alpha_i$ for, e.g., hardware, configuration. "Triad" in the table simply refers to a calibration method that uses a reference input signal, which yields an ideal solution for the coefficients $\alpha_i$ in the triplet model. Of course, as discussed above, blind learning seeks to determine the dominant triplets and/or the appropriate coefficients $\alpha_i$ when such a reference input signal is not available. FIG. 2E is a simulation plot of the NL signal-to-noise-distortion ratio (SNDR) improvement after the NL correction for the tracking and calibration modes as a function of baud rate. The sampling rate used was 225 Giga samples per second (Gsps) and the signal baud rate was swept from 67 GB/s to 200 GB/s. The results are plotted for three values of D (or the maximum delay of the autocorrelation function). There are 10, 20, and 35 equations for the least-squares optimization for D=2, 3, and 4, respectively.

Figure 2F:
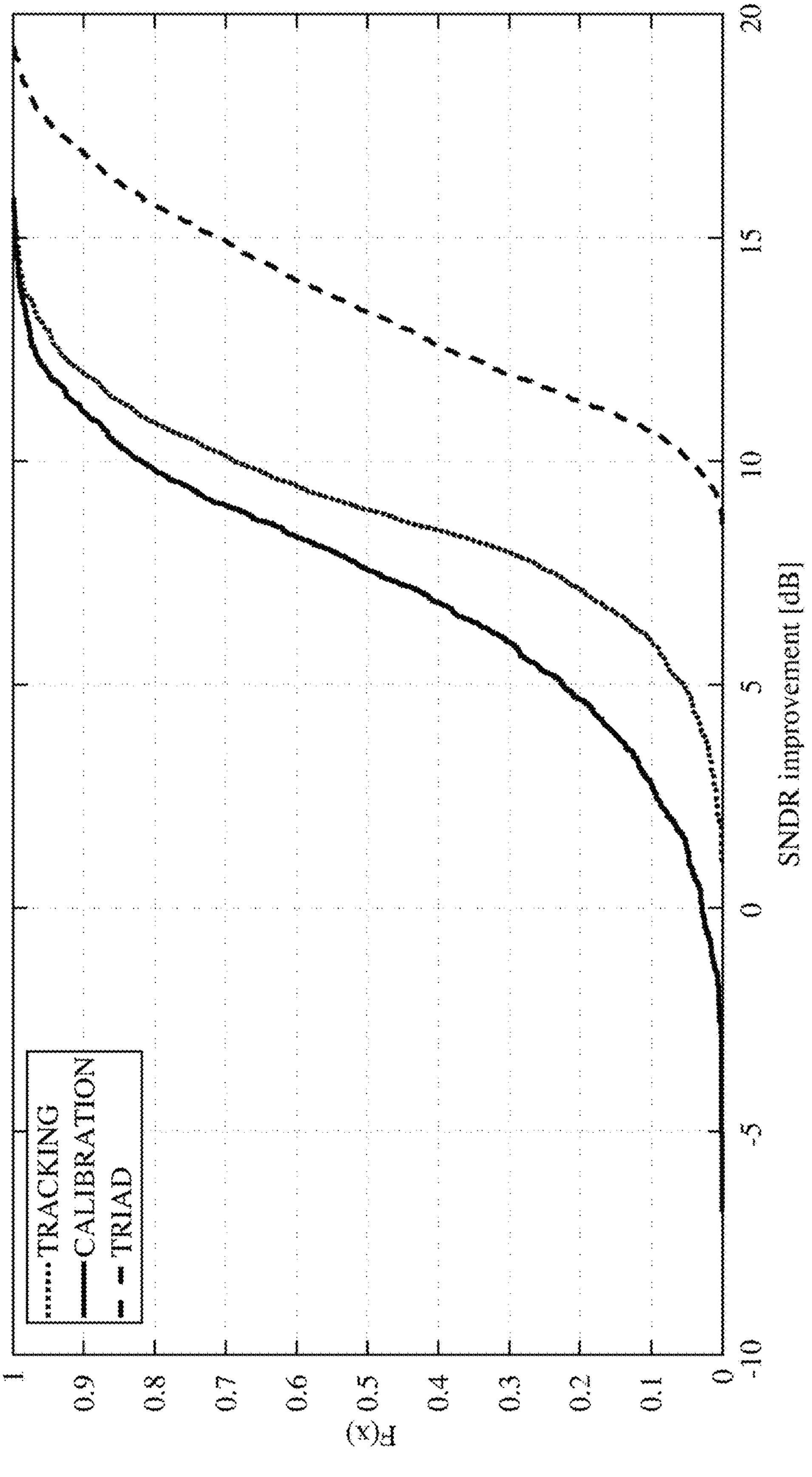
FIG. 2F is a simulation plot of the cumulative distribution function (CDF) of SNDR improvement for a 200 Gigabaud (GB)/s transmission, where a maximum delay of an autocorrelation function is D=2.
Figure 2G:
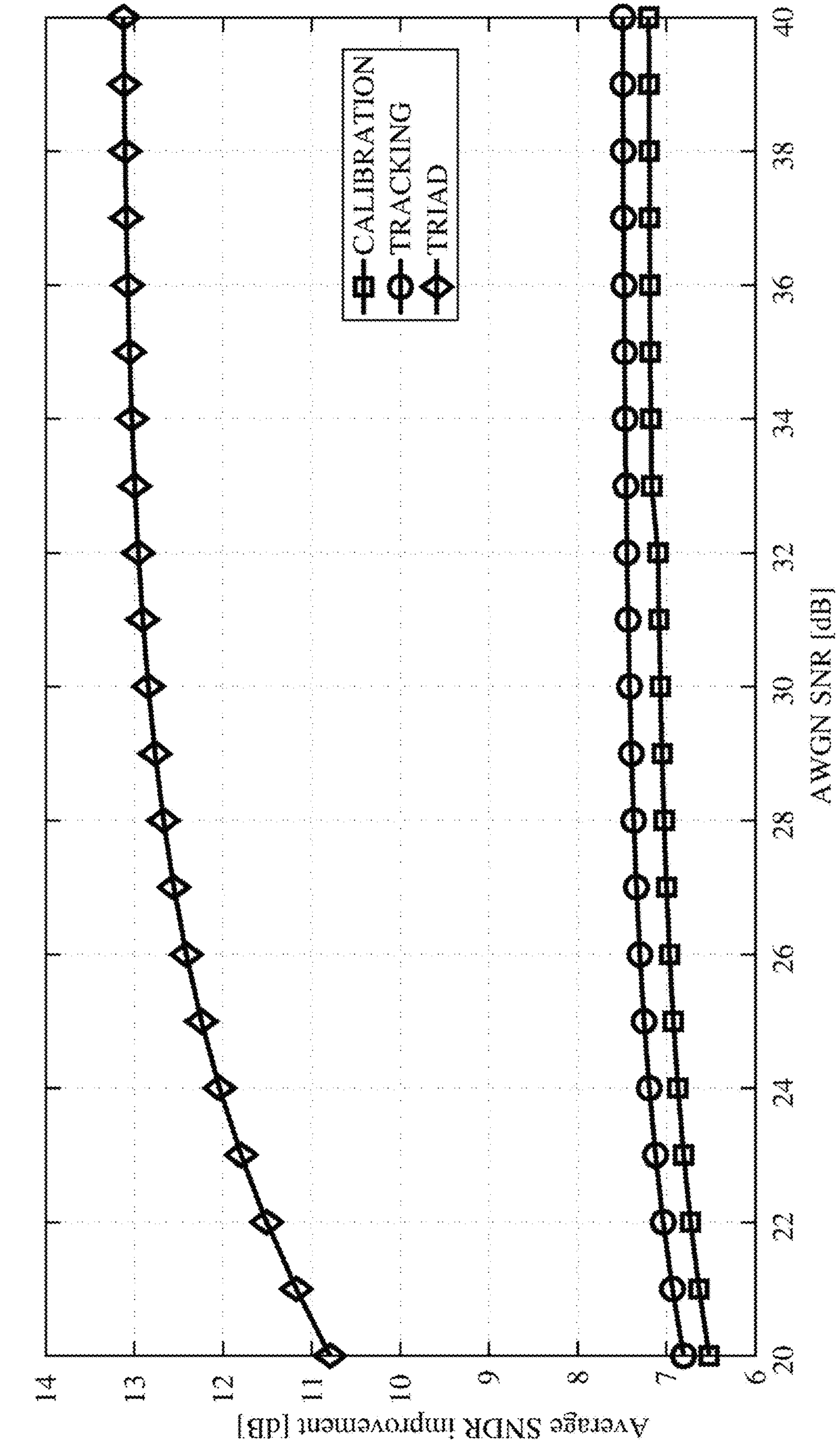
FIG. 2G is a simulation plot of NL SNDR improvement across additive white Gaussian noise (AWGN) signal-to-noise ratio (SNR).

As a reference, the result for the Triad method is also illustrated. The AWGN SNR is 100 dB for this plot. FIG. 2F is a simulation plot of the cumulative distribution function (CDF) of SNDR improvement for a 200 GB/s transmission and D=2. In the calibration mode, in 5 percent of the cases, the SNDR was worsened when the blind NL distortion learning algorithm was used. However, in the tracking mode, the blind NL distortion learning algorithm provided performance that was comparable to that of Triad at the lower gain values. FIG. 2G is a simulation plot of the NL SNDR improvement across AWGN SNR. Here, the AWGN SNR was swept for a 200 GB/s transmission. As shown, with an increasing amount of noise at the output of the ADC, there is a slight degradation in SNDR improvement.

Figure 2H:
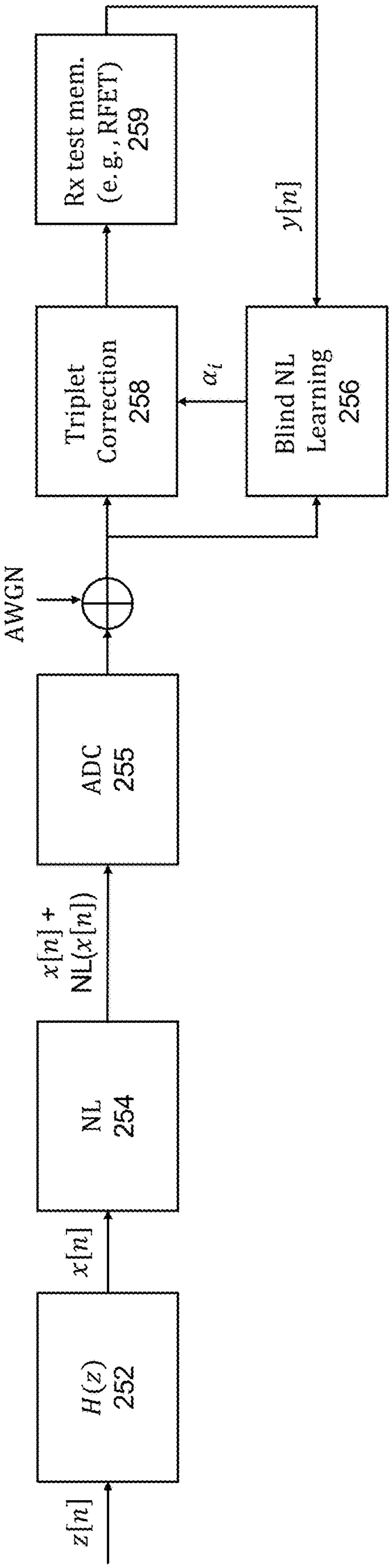
FIG. 2H is a block diagram of another example, non-limiting embodiment of a NL distortion correction system in accordance with various aspects described herein.
Figure 2I:
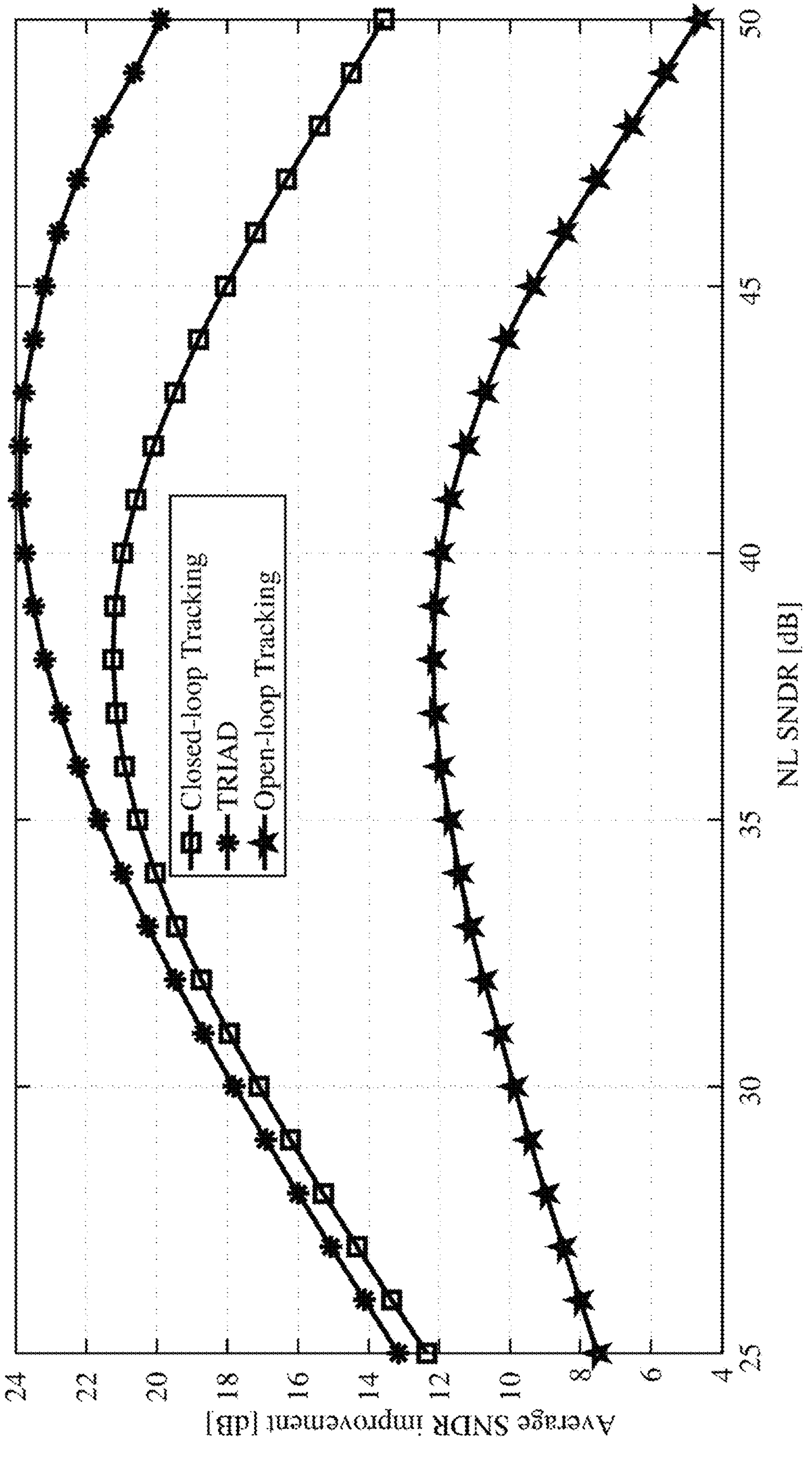
FIG. 2I is a simulation plot of the impact of NL SNR on the blind NL distortion learning performance relating to the system of FIG. 2H.

The following is a description of an implementation of the blind NL learning algorithm used in closed-loop tracking, where access to the output signal y[n] is after (rather than prior to) triplet correction. FIG. 2H is a block diagram of another example, non-limiting embodiment of a NL distortion correction system in accordance with various aspects described herein. The system of FIG. 2C is similar to the system of FIG. 2B, but where an Rx test memory (e.g., RFET capture) is located after the (e.g., hardware) triplet correction block 258, and where the blind NL distortion learning algorithm computes the residual NL and updates the triplet coefficients recursively. The triplet coefficients at time i+1 may be updated as $$\alpha_{i+1} = (1-\mu)\alpha_i + \beta\Delta\alpha_i$$

where $\beta$ is the tracking gain, $\mu$ is the leakage, and $\Delta\alpha_i$ is the residual NL calculated by the blind algorithm. In some embodiments, additional coefficients may be derived and used to enable smaller adjustments over time prior to reaching the desired response. FIG. 2I is a simulation plot of the impact of NL SNR on the blind NL distortion learning performance relating to the system of FIG. 2H. The transmission baud rate was 200 GB/s, the five random triplets were chosen from the nine triplets, and D=2. The tracking loop gain $\beta$ was set to 0.05. Note that this gain is an important parameter and large values can lead to instability and diverging results. As the NL SNR increases from 20 dB to 40 dB, we observe improved performance. As the values of $\alpha_i$ decrease, the approximation for $$R_4^y$$

($t_1$, $t_2$, $t_3$) becomes more accurate, which ultimately improves the estimation accuracy of $\alpha_i$. The results demonstrate that closed-loop tracking provides greater SNDR improvement as compared to open-loop mode (i.e., one-shot learning). The results achieved are very close to the optimal solution provided by Triad.

It will be understood and appreciated that techniques discussed herein that involve approximations may involve or include satisfying particular thresholds in whole or in part.

It is also to be understood and appreciated that, although one or more of the drawing figures might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, circuits, etc. may have been illustrated in one or more of the drawing figures as separate components, devices, systems, modules, circuits, blocks, etc., it will be appreciated that multiple components, devices, systems, modules, circuits, blocks, etc. can be implemented as a single component, device, system, module, circuit, block, etc., or a single component, device, system, module, circuit, block, etc. can be implemented as multiple components, devices, systems, modules, circuits, blocks, etc. Additionally, functions described as being performed by one component, device, system, module, circuit, block, etc. may be performed by multiple components, devices, systems, modules, circuits, blocks, etc., or functions described as being performed by multiple components, devices, systems, modules, circuits, blocks, etc. may be performed by a single component, device, system, module, circuit, block, etc.

Figure 3:
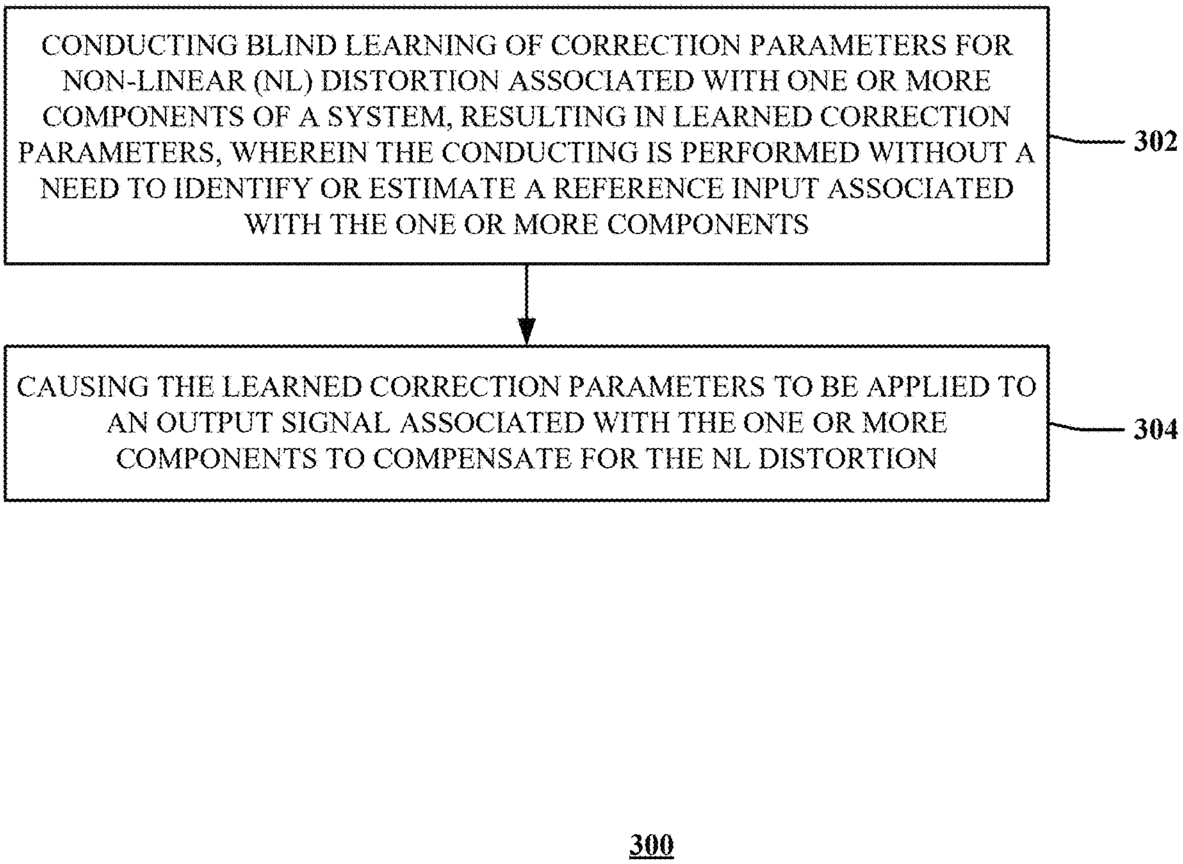
FIG. 3 depicts an illustrative embodiment of a method in accordance with various aspects described herein.

FIG. 3 depicts an illustrative embodiment of a method 300 in accordance with various aspects described herein.

At 302, the method can include conducting blind learning of correction parameters for non-linear (NL) distortion associated with one or more components of a system, resulting in learned correction parameters, wherein the conducting is performed without a need to identify or estimate a reference input associated with the one or more components. For example, the blind NL distortion learning block 256 may, similar to that described above with respect to at least FIG. 2A, perform one or more operations that include conducting blind learning of correction parameters $\alpha_i$ for NL distortion associated with one or more components of a system, such as a TIA and/or an ADC, resulting in learned correction parameters, wherein the conducting is performed without a need to identify or estimate a reference input associated with the one or more components.

At 304, the method can include causing the learned correction parameters to be applied to an output signal associated with the one or more components to compensate for the NL distortion. For example, the blind NL distortion learning block 256 may, similar to that described above with respect to at least FIG. 2A, perform one or more operations that include causing the learned correction parameters $\alpha_i$ to be applied to an output signal y[n] associated with the one or more components to compensate for the NL distortion.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
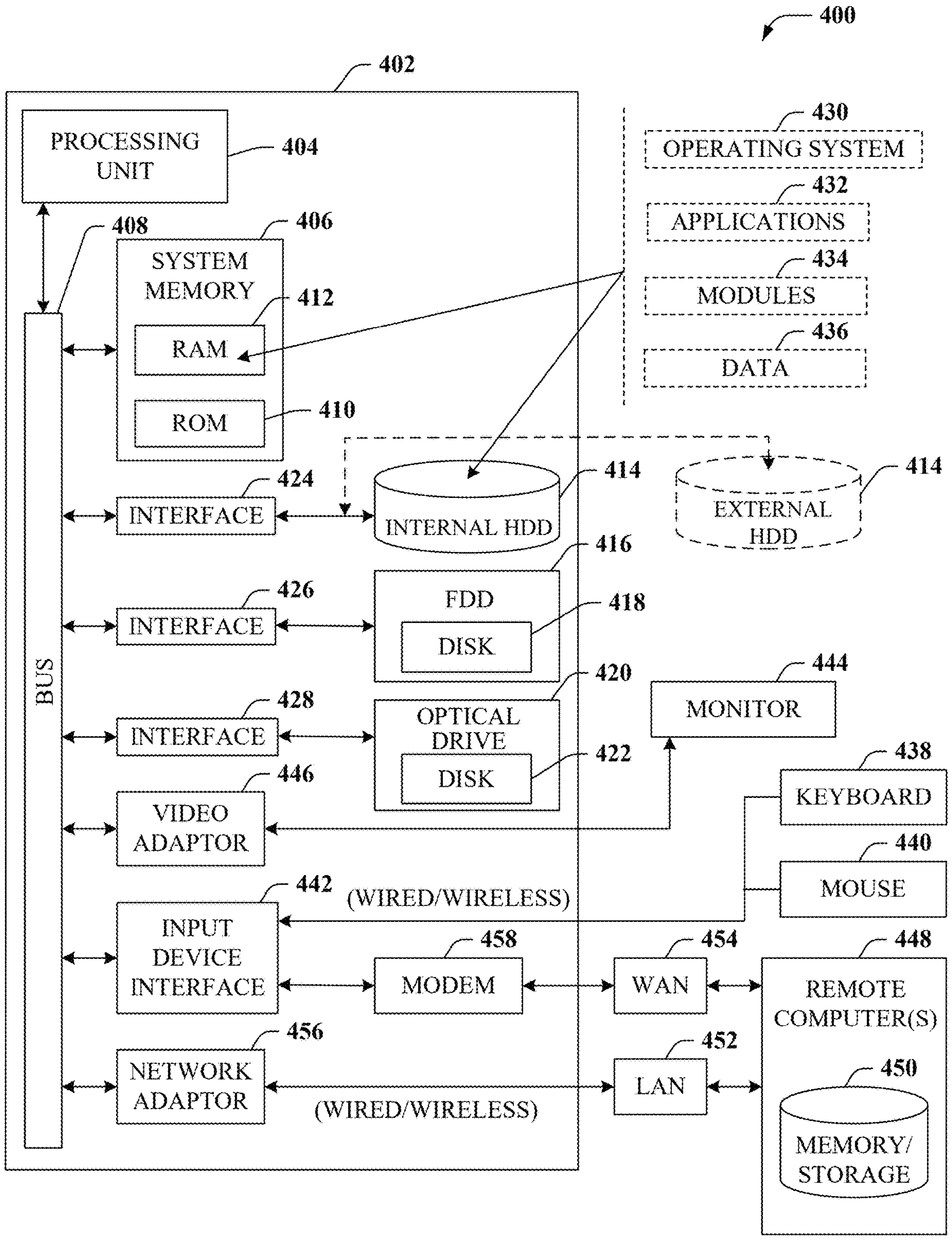
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part blind learning of Volterra equalizer parameters.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A coherent optical receiver, comprising:

one or more components configured to receive or perform processing relating to optical signals; and a correction system configured to perform operations that include conducting blind learning of correction parameters for non-linear (NL) distortion associated with the one or more components, resulting in learned correction parameters, wherein the conducting is performed without a need to identify or estimate a reference input associated with the one or more components, wherein the conducting involves modeling of the NL distortion using a $3^{rd}$-order Volterra series-based triplet model, and wherein the learned correction parameters comprise gain factors associated with triplet terms of the triplet model, and causing the learned correction parameters to be applied to an output signal associated with the one or more components to compensate for the NL distortion.

2. The coherent optical receiver of claim 1, wherein the conducting is performed based on the output signal.

3. The coherent optical receiver of claim 1, wherein one or more of the conducting and the causing are performed while the coherent optical receiver is operated in a mission mode under nominal conditions where the NL distortion is subject to change.

4. The coherent optical receiver of claim 1, wherein the conducting is performed in a calibration mode in which particular triplet terms of the triplet model that are of determined dominance are unknown.

5. The coherent optical receiver of claim 4, wherein the conducting involves solving for the particular triplet terms, and solving for gain factors associated with the particular triplet terms.

6. The coherent optical receiver of claim 1, wherein the conducting is performed in a tracking mode in which particular triplet terms of the triplet model that are of determined dominance are known.

7. The coherent optical receiver of claim 6, wherein the conducting involves solving for gain factors associated with the particular triplet terms.

8. The coherent optical receiver of claim 1, wherein the conducting involves performing an empirical calculation of a $4^{th}$ moment of the output signal.

9. The coherent optical receiver of claim 1, wherein the conducting involves an approximation of $2^{nd}$-order statistics of an input associated with the one or more components to a sampled autocorrelation of the output signal.

10. The coherent optical receiver of claim 1, wherein the one or more components comprise one or more analog amplifiers, one or more optical amplifiers, one or more analog-to-digital converters (ADCs), one or more fibers, or a combination thereof.

11. The coherent optical receiver of claim 1, wherein the output signal comprises an analog-digital-converter (ADC) output that is stored in a receiver front end test (RFET) memory.

12. A non-transitory machine-readable medium, comprising executable instructions that, when executed by a processing system including a processor, facilitate performance of operations, the operations comprising:

conducting blind learning of correction parameters for non-linear (NL) distortion associated with one or more components of a system, resulting in learned correction parameters, wherein the conducting is performed without a need to identify or estimate a reference input associated with the one or more components, wherein the conducting involves modeling of the NL distortion using a $3^{rd}$-order Volterra series-based triplet model, and wherein the learned correction parameters comprise gain factors associated with triplet terms of the triplet model; and causing the learned correction parameters to be applied to an output signal associated with the one or more components to compensate for the NL distortion.

13. The non-transitory machine-readable medium of claim 12, wherein the conducting involves performing an empirical calculation of a $4^{th}$ moment of the output signal.

14. The non-transitory machine-readable medium of claim 12, wherein the conducting involves an approximation of $2^{nd}$-order statistics of an input associated with the one or more components to a sampled autocorrelation of the output signal.

15. The non-transitory machine-readable medium of claim 12, wherein the one or more components comprise one or more analog amplifiers, one or more optical amplifiers, one or more analog-to-digital converters (ADCs), one or more fibers, or a combination thereof.

16. A method, comprising:

conducting, by at least one processor, blind learning of correction parameters for non-linear (NL) distortion associated with one or more components of a system, resulting in learned correction parameters, wherein the conducting is performed without a need to identify or estimate a reference input associated with the one or more components, wherein the conducting involves modeling of the NL distortion using a $3^{rd}$-order Volterra series-based triplet model, and wherein the conducting is performed in a calibration mode in which particular triplet terms of the triplet model that are of determined dominance are unknown; and causing, by the at least one processor, the learned correction parameters to be applied to an output signal associated with the one or more components to compensate for the NL distortion.

17. The method of claim 16, wherein the system comprises a coherent optical receiver.

18. The method of claim 16, wherein the conducting involves solving for the particular triplet terms, and solving for gain factors associated with the particular triplet terms.

19. The method of claim 16, wherein the conducting involves performing an empirical calculation of a $4^{th}$ moment of the output signal.

20. The method of claim 16, wherein the output signal comprises an analog-digital-converter (ADC) output that is stored in a receiver front end test (RFET) memory.

* * * * *